Aug. 27, 1929.   J. J. SMITH   1,726,196
DIRIGIBLE HEADLIGHT
Filed May 10, 1928
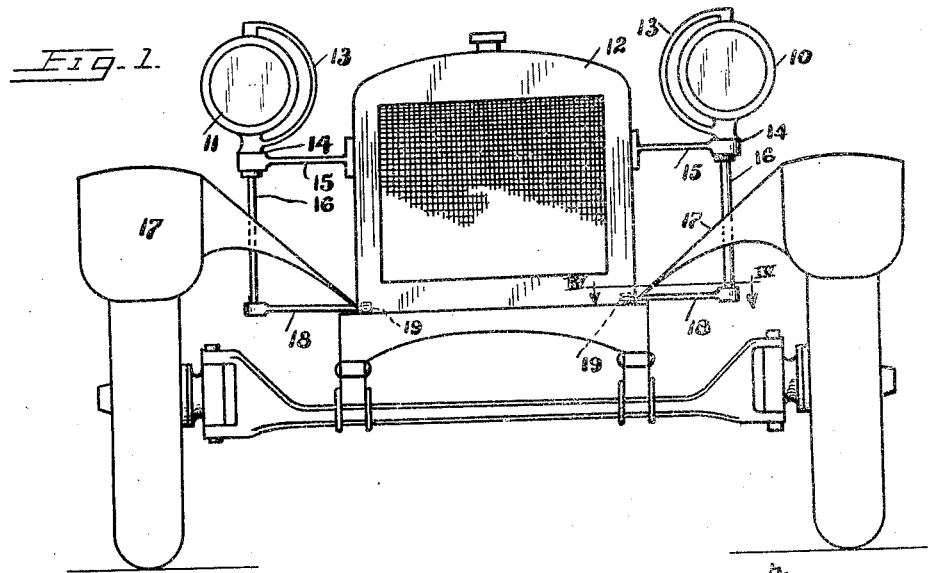
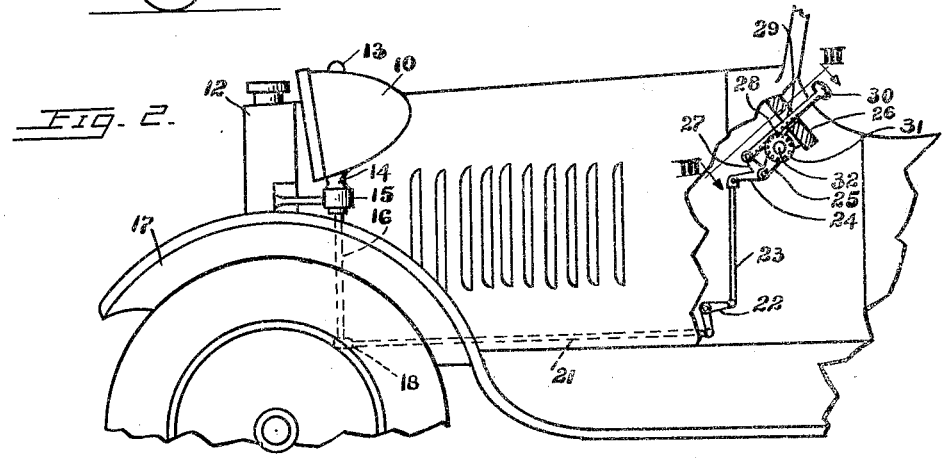
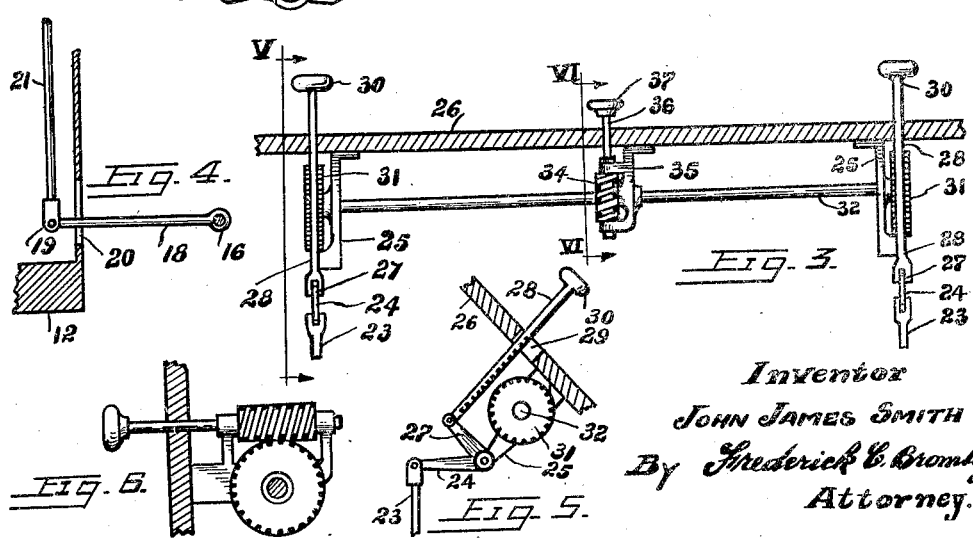
Inventor
John James Smith
By Frederick E. Bromley
Attorney Patented Aug. 27, 1929.

1,726,196

UNITED STATES PATENT OFFICE.

JOHN JAMES SMITH, OF TORONTO, ONTARIO, CANADA.

DIRIGIBLE HEADLIGHT.

Application filed May 10, 1928, Serial No. 276,645, and in Canada December 28, 1927.

The invention relates to improvements in dirigible headlights as described in the present specification and shown in the accompanying drawings which form part of the same.

The invention appertains to headlights for motor vehicles and has for its object mainly to pivotally mount the headlights for turning movement in a horizontal plane and to furnish them with a manually operable link mechanism by which they may be turned from side to side. By means of the dirigible construction, the driver of an automobile may swing the headlights about their axes when rounding a dangerous or sharp bend in the road in order that the light beams will illuminate the road directly ahead as the vehicle rounds the curve.

Furthermore, the invention is particularly useful for the purpose of enabling the driver of an automobile to turn the headlights from another vehicle passing in the opposite direction so as not only to avoid dazzling the other driver but also to illuminate the curb side of the road when passing over highways where there is danger of running into ditches.

A further object of the present invention resides in the provision of independent controls for each of the two headlights of the motor vehicle whereby one of them may be turned laterally, if so desired, while the other is retained in its normal position. These independent controls are interconnected by means of a master control whereby both are operable at the same time by means of a knob on the dash. The master control obviates the necessity of using two hands when it is desired to turn the headlights simultaneously, but does not however interfere with their independent operation.

Referring to the drawings, Figure 1 is a front view of an automobile showing a pair of headlights to which the present invention is applied.

Figure 2 is a side elevation of the front portion of the automobile showing the near headlight and the independent control therefor.

Figure 3 is a transverse section of the dash showing the independent controls for the headlights attached to the master control. This view is taken on the line 3—3 of Figure 2.

Figure 4 is a detail taken on the line 4—4 of Fig. 1.

Figure 5 is a section taken on the line 5—5 of Fig. 3 illustrating one of the independent controls disengaged from the master control.

Figure 6 is a section taken on the line 6—6 of Fig. 3 depicting the master control.

Like numerals of reference indicate corresponding parts in each of the figures throughout the drawings.

In carrying out this invention it is advocated that the headlights 10 and 11 be positioned near the top of the radiator 12 and tilted slightly downwardly so as to direct the beams of light downwardly onto the road surface in advance of the car. This prevents the rays from shining into the face of passing traffic. The headlights are each supported by a yoke 13 of C-shaped configuration, the ends of which are rigidly attached to the top and bottom portions of the headlights, which yoke is swivelly mounted as at 14 in a bracket 15 that is rigidly attached to the corresponding side of the radiator.

Since the independent controls are of like construction a description of one will suffice for both. Fixedly secured to the yoke 13 is a vertical shaft 16 that projects downwardly from the front fender 17 and terminates on a level with the chassis of the car. The lower end rigidly carries a lever 18 that projects inwardly towards the hood and enters therein so that its distal end 19 operates in a slot 20, see Figure 4. It is preferable that the lever enters the hood at the point at which it meets the chassis.

The horizontal rod 21 is pivoted to the distal end 19 of the lever 18 and likewise connected to one arm of a bellcrank 22 that is pivotally supported interiorly of the hood in the vicinity of its rear end. The other arm is pivoted to a vertical rod 23, the upper end of which is likewise connected to a further bellcrank 24 that is bracketed as at 25 to the rear of the dash 26. The complementary arm 27 of the latter bellcrank is pivoted to a rack 28 that extends through an opening 29 in the dash and terminates in a handle 30. The opening 29 is of sufficient size to permit of the rack being raised and lowered through a slight angle sufficient to bring it into and out of engagement with a spur gear 31 that is preferably supported in the bracket 25.

In the use of the independent control, when it is desired to shift the headlight laterally the handle 30 is grasped and raised slightly so as to disengage the teeth of the rack 28 from those of the gear 31, whereupon the handle is either pulled or pushed in order to turn the headlight by the link connection. Having turned the headlight it may be maintained in that position by merely dropping the handle so that the rack re-engages the gear which serves as a locking element since it is held against rotation by the master control hereinafter described.

The master control is accomplished by connecting the two gears 31 to a common shaft 32 such as by keying or otherwise, such shaft being preferably journaled in the brackets 25. Intermediate of the length of the shaft is provided a worm wheel 33 fixed to the shaft and meshing with the worm 34 that is bracketed at 35. Fixedly secured to the worm is a short rod 36 that is rotatably mounted in the bracket that carries it. The rod extends freely through the dash and terminates in a knob 37.

In the use of the master control, upon turning the knob 37 the worm wheel and its worm operate to rotate the shaft 32 and since this shaft is connected to the gears 31 of the two independent controls they are simultaneously operated and in this manner function to turn the headlights in the same direction at the same time. A distinctive advantage of employing the worm and worm wheel control is that it functions as a self-locking device for the independent controls, serving the purpose of holding the spur gears 31 against undesirable movement when the knob 37 is not being turned.

What I claim is:—

The combination with a pair of swivelly mounted headlights, of a transverse shaft, supporting elements therefor, a pair of spur gears, one of said gears being rigidly attached to each end of said shaft, manually operable means for turning the shaft, a rack arranged over each gear with the teeth held in engagement with the teeth of the respective gear by gravity, separate and independent means pivoted to an end of each rack to convert its reciprocable movement into a turning movement of one of the headlights, and a handle borne by each of the distal ends of the racks whereby they may be separately raised from engagement with the gears in order to control the headlights independently of each other.

Signed at Toronto, Canada, the 7th day of May, 1928.

JOHN JAMES SMITH.